Dec. 13, 1966   J. F. VAN VALKENBURG   3,291,422
ALIGNING AND CENTERING DEVICE FOR HELICOPTER

Filed May 5, 1965                                3 Sheets-Sheet 1

INVENTOR.
JAMES F. VAN VALKENBURG
BY
*Arthur L. Collins*
ATTORNEY

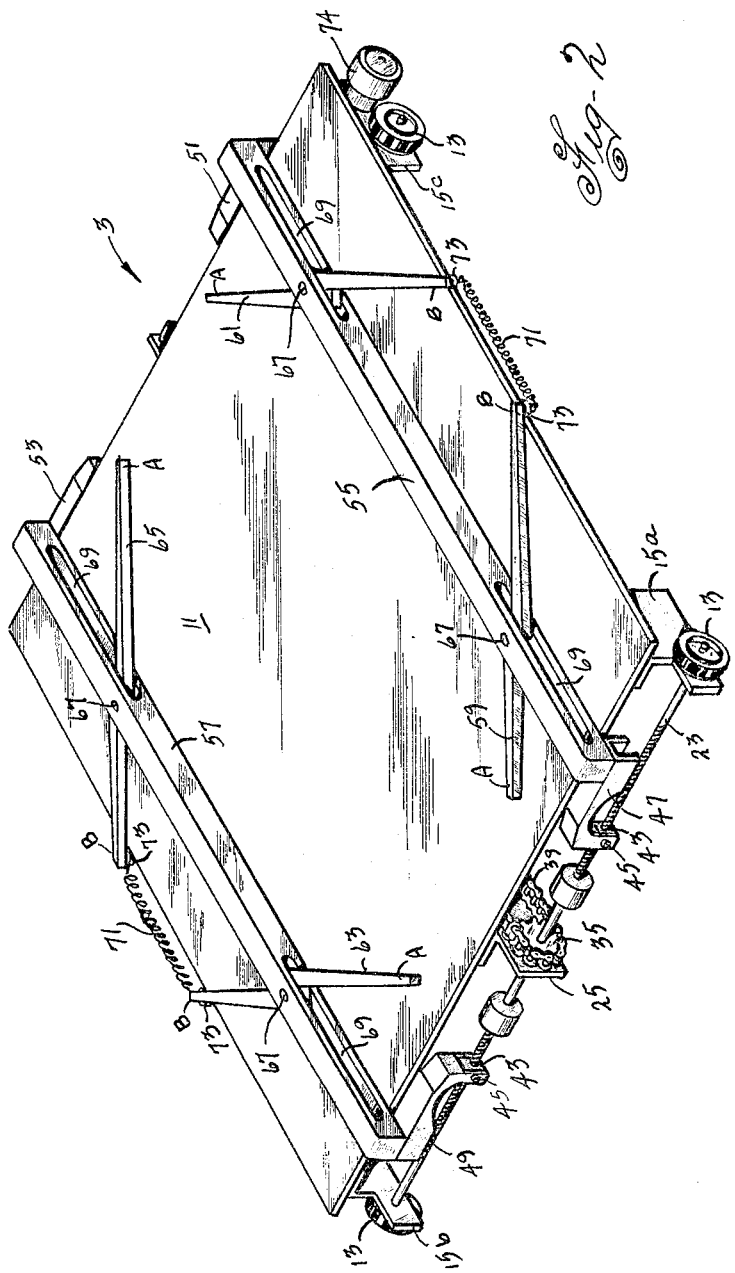

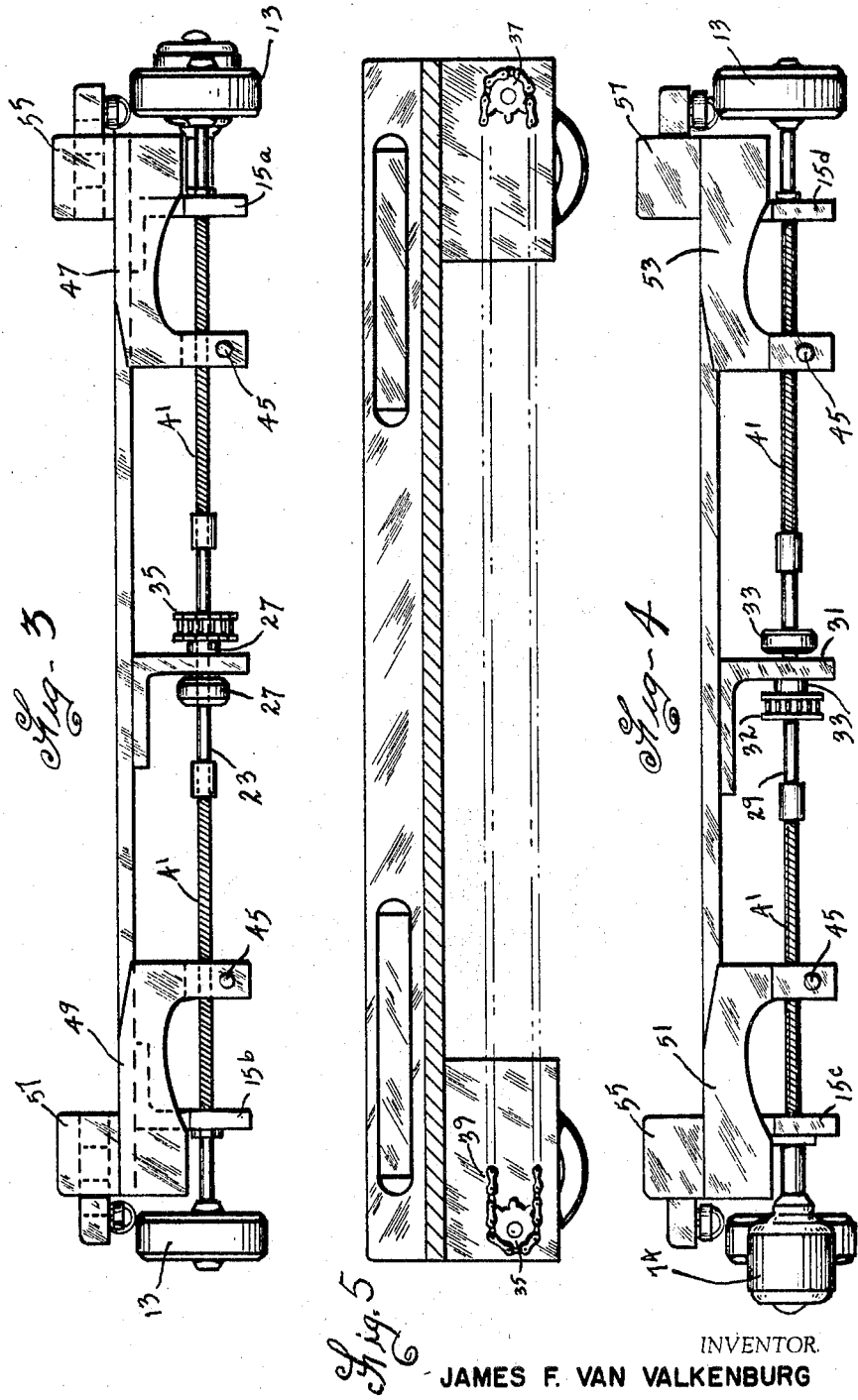

United States Patent Office 3,291,422
Patented Dec. 13, 1966

3,291,422
ALIGNING AND CENTERING DEVICE
FOR HELICOPTER
James F. VanValkenburg, Primos, Pa., assignor to the United States of America as represented by the Secretary of the Navy
Filed May 5, 1965, Ser. No. 453,528
7 Claims. (Cl. 244—114)

The invention described herein may be manufactured and used by or for the Government of the United States of America for governmental purposes without the payment of any royalties thereon or therefor.

The present invention relates to novel and improved apparatus for orienting and positioning one object with respect to another in a predetermined manner. More specifically, the invention relates to unique apparatus for orienting and centering a drone or other type of helicopter on a dolly in preparation for transfer into the confined hangar storage area on a destroyer or other relatively small naval vessel.

Modern naval vessels of the destroyer and other similar types now often include a helicopter hangar and a hangar flight deck as standard equipment. Various procedures and apparatus have been used heretofore to store and to run the helicopters in and out of the relatively confined areas within such hangars. Thus, for example, in accordance with one method which is used at the present time when a helicopter is landed on the flight deck, it is first centered and aligned on the deck by the use of manpower. Cable assemblies are then rigged on the deck and cable follower wheel assemblies are attached to the ends of the landing gear skids of the helicopter for guidance of the helicopter into the hangar. The helicopter is then raised and wheel assemblies are secured to each skid. Bridles are then attached to spreader bars between the skids and the helicopter is moved into the hangar. Considerable difficulty has been experienced, however, in handling the helicopter in such a manner particularly in heavy and rough seas.

It is therefore a principal object of the present invention to provide apparatus which can be used with efficiency and facility in handling a helicopter in and out of the confined area within a hangar.

It is a further object of the present invention to provide a novel and improved dolly on which a helicopter can be landed together with apparatus for automatically adjusting the orientation and position of the helicopter on the dolly in a predetermined manner.

Other objects and many of the attendant advantages of this invention will be readily appreciated as the same becomes better understood by reference to the following detailed description when considered in connection with the accompanying drawings wherein:

FIG. 2 is a perspective view of the improved dolly of the present invention after the helicopter thereon has been properly aligned and centered;

FIG. 3 is a view of one side of the device shown in FIG. 2;

FIG. 4 is a view of the other side of the device shown in FIG. 2; and

FIG. 5 is an end view of the invention shown in FIG. 2.

Figure 1:
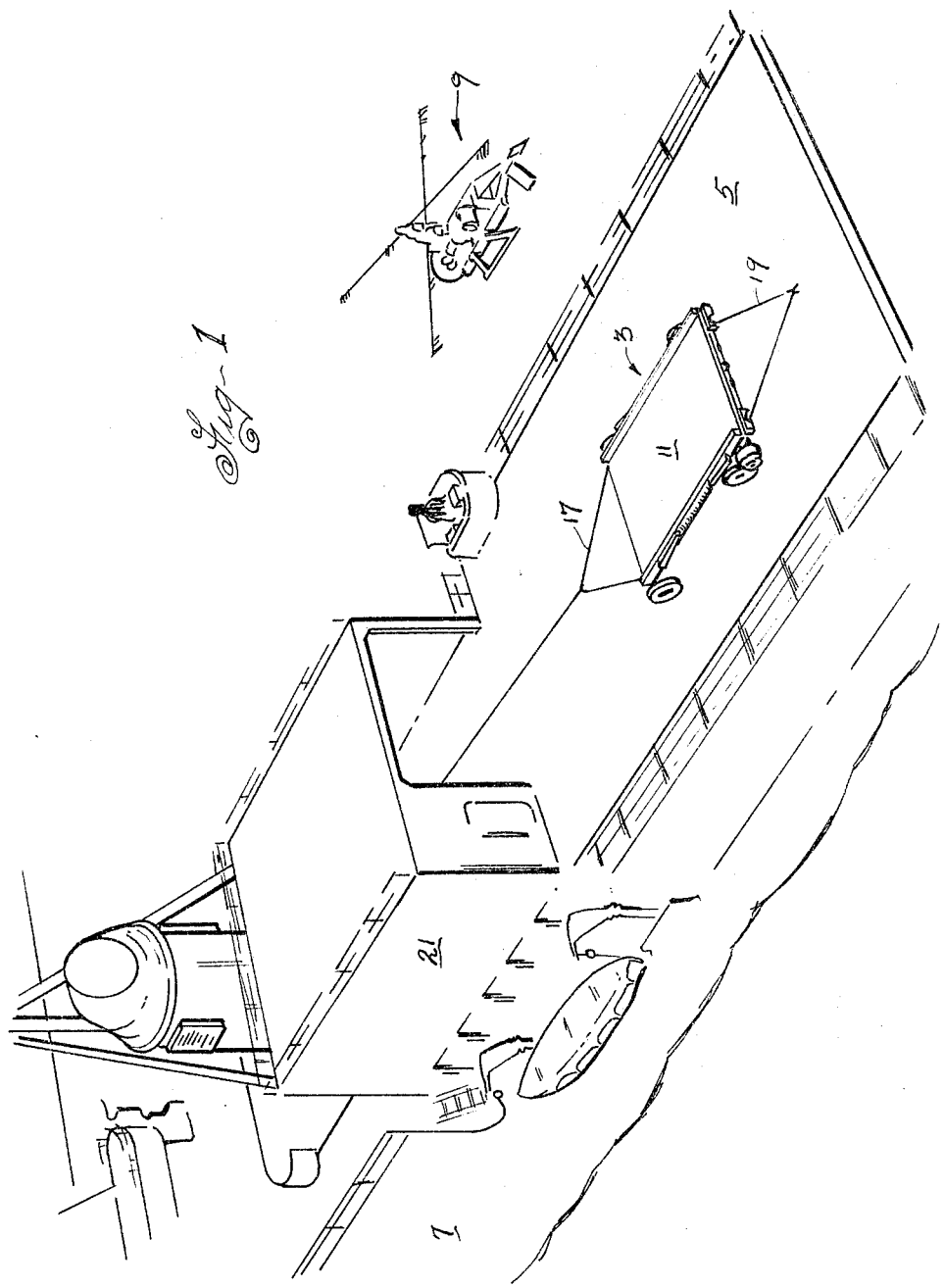
FIG. 1 is a perspective view of a preferred embodiment of the present invention on the flight deck of a vessel prior to the landing of a helicopter thereon.

Referring now to the various figures of the drawing, it will be noted that the helicopter dolly or the like 3 is shown positioned on the hangar deck 5 of the destroyer or other vessel 7 ready for the drone or other other type of helicopter 9 to land on its landing surface 11. Wheels 13 of a suitable type are mounted on the lugs or the like 15a–15d that extend downwardly from each corner of the rectangular landing surface 11. Conventional fore and aft bridle assemblies 17 and 19 are preferably provided to control movement of the dolly 3 in and out of the hangar 21 as desired.

The shaft 23 is rotatably mounted between the wheel supporting lugs 15a and 15b. An additional lug 25, which also extends downwardly from the lower surface of the dolly 3, preferably rotatably supports the shaft 23 at a suitable intermediate point. The cylindrical stop member 27, which are fixedly secured to the shaft 23 preferably on either side of the lug 25, limit movement of the shaft along it longitudinal axis. Shaft 29 is similarly rotatably mounted between the wheel supporting lugs 15c and 15d along the opposite edge of the landing surface 11. The lug 31 also rotatably supports the shaft 29 at an intermediate point. Cylindrical stop members 33 are fixedly secured to the shaft 29 on either side of the lug 31 and limit shaft movement along its longitudinal axis. Spur gears 35 and 37 are respectively secured to shafts 23 and 29 preferably as shown adjacent the cylindrical stops 27 and 33 and are interconnected by a suitable continuous chain or the like 39. The electrical or air motor or any other conventional rotary drive source is coupled to shaft 29 in any suitable manner.

Opposite ends of shafts 23 and 29 are threaded as at 41 and threadedly engage the swivel blocks 43 pivotably mounted on pins 45 between the bifurcated ends of the cam members 47, 49, 51 and 53. Cam members 47 and 51 are rigidly interconnected by the elongated bar 55 which normally extends across one end of the landing surface 11 of dolly 3. Cam members 49 and 53 are similarly rigidly interconnected by the elongated bar 57 which is substantially parallel to elongated bar 55 and which normally extends across the other end of the landing surface 11 of dolly 3.

Levers 59, 61, 63 and 65 are pivotally mounted on pins 67 in elongated slots 69 at opposite ends of the elongated bars 55 and 57. Each of the said levers is preferably offset as shown such that the ends A thereof can swing into their respective slots 69. A spring or any other suitable biasing device 71 is connected between the opposite ends B of each pair of levers on each elongated bar. The cam followers or rollers 73 are pivotally mounted on the lower surface of each of the levers at their said opposite ends and as will be more apparent hereinafter engage the adjacent edge of the landing surface 11 for rotation of the levers against the bias of springs 71.

In operation when a helicopter 9 is to be landed on the vessel 7 and transferred into its hanger 21 under rough sea conditions, the dolly 3 is first suitably centrally positioned on the hangar deck 5 by means of the fore and aft bridle assemblies 17 and 19. The motor 74 is then energized so as to rotate shafts 23 and 29 and drive the swivel blocks 43 coupled thereto toward the outer ends of their respective shafts. As the elongated bars 55 and 57 simultaneously move away from each other and beyond the outer edges of the landing surface 11, the cam members 47–51 slide over the outwardly projecting portions of wheel supporting lugs 15 and control continued movement of the bars 55 and 57 outwardly and downwardly away from and below the landing surface. The drone or other type helicopter 11 is then guided down onto the landing surface. The motor 74 is then again energized so as to rotate shafts 23 and 29 in the opposite direction and move swivel blocks 43 and cam members 47–51 toward the center of shafts 23 and 29. As the elongated bars 55 and 57 simultaneously move inwardly toward the center of the landing surface 11, cam followers 73 engage opposite edges of the landing surface and rotate levers 59–65 about pins 67 on elongated bars 55 and 57. In this way, as the elongated bars 55 and 57 center the helicopter on one axis of the landing surface, the four pivoting levers 59–65 center it on the other axis of the landing surface. After the helicopter is properly oriented and centered on the dolly 3, it is secured to the dolly 3 in any suitable conventional manner as by clips not shown on the drawing secured to elongated bars 55 and 57 engaging the helicopter skids. The dolly and helicopter are then transferred into the hangar of the vessel by means of the bridle assemblies 17 and 19.

Obviously many modifications and variations of the present invention are possible in the light of the above teachings. It is therefore to be understood that within the scope of the appended claims, the invention may be practiced otherwise than as specifically described.

What is claimed is:

1. Apparatus for positioning an object on a surface in a predetermined manner, said apparatus comprising:
    (a) a pair of elongated bars which are positioned in a parallel relationship at opposite ends of the surface;
    (b) means for controlling movement of the elongated bars toward and away from each other along the surface;
    (c) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
    (d) means normally biasing each pair of levers so as to increase the projected angle therebetween;
    (e) and means secured to the said other ends of each pair of levers for engaging the adjacent ends of the surface and rotating the levers about their pivot points on their respective elongated bars as the elongated bars move along the surface.

2. Apparatus for positioning a helicopter on a confined rectangular landing surface in a predetermined manner, said apparatus comprising:
    (a) a pair of elongated bars which are positioned in a parallel relationship at opposite ends of the surface;
    (b) means for controlling movement of the elongated bars toward and away from each other along the surface;
    (c) means for at times positioning the elongated bars beyond and below the landing surface;
    (d) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
    (e) means normally biasing each pair of levers so as to increase the projected angle therebetween;
    (f) and means secured to the said other ends of each pair of levers for engaging the adjacent ends of the surface and rotating the levers about their pivot points on their respective elongated bars as the elongated bars move along the surface.

3. Apparatus for positioning a helicopter on a confined rectangular landing surface in a predetermined manner, said apparatus comprising:
    (a) a pair of elongated bars which are positioned in a parallel relationship at opposite ends of the surface;
    (b) means for controlling movement of the elongated bars toward and away from each other along the surface;
    (c) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
    (d) a biasing spring which extends in tension between the said other ends of each pair of levers;
    (e) means normally biasing each pair of levers so as to increase the projected angle therebetween;
    (f) and means secured to the said other ends of each pair of levers for engaging the adjacent ends of the surface and rotating the levers about their pivot points on their respective elongated bars as the elongated bars move along the surface.

4. Apparatus for positioning a helicopter on a confined rectangular landing surface in a predetermined manner, said apparatus comprising:
    (a) means for mounting the landing surface on wheels;
    (b) a pair of elongated bars which are positioned in a parallel relationship at opposite ends of the surface;
    (c) means for controlling movement of the elongated bars toward and away from each other along the surface;
    (d) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
    (e) means normally biasing each pair of levers so as to increase the projected angle therebetween;
    (f) and means secured to the said other ends of each pair of levers for engaging the adjacent ends of the surface and rotating the levers about their pivot points on their respective elongated bars as the elongated bars move along the surface.

5. Apparatus for positioning a helicopter on a confined rectangular landing surface in a predetermined manner, said apparatus comprising:
    (a) a pair of elongated bars which are positioned in a parallel relationship at opposite ends of the surface;
    (b) means for controlling movement of the elongated bars toward and away from each other along the surface;
    (c) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
    (d) means normally biasing each pair of levers so as to increase the projected angle therebetween;
    (e) and cam followers rotatably secured to the said other ends of each pair of levers for engaging the adjacent ends of the surface and rotating the levers about their pivot points on their respective elongated bars as the elongated bars move along the surface.

6. Apparatus for positioning a helicopter on a confined rectangular landing surface in a predetermined manner, said apparatus comprising:
    (a) means for mounting the landing surface on wheels;
    (b) a pair of elongated bars which are positioned in a parallel relationship at opposite ends of the surface;
(c) means for controlling movement of the elongated bars toward and away from each other along the surface;
(d) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
(e) a biasing spring which extends in tension between the said other ends of each pair of levers;
(f) and cam followers rotatably secured to the said other ends of each pair of levers for engaging the adjacent ends of the surface and rotating the levers about their pivot points on their respective elongated bars as the elongated bars move along the surface.

7. Apparatus for positioning a helicopter on a confined rectangular landing surface in a predetermined manner, said apparatus comprising:
(a) means for mounting the landing surface on wheels;
(b) a pair of elongated bars which are positioned in a parallel relationship at opposite ends of the surface;
(c) means for controlling movement of the elongated bars toward and away from each other along the surface;
(d) means for at times positioning the elongated bars beyond and below the landing surface;
(e) a pair of levers pivotably mounted on each elongated bar, the levers of each pair of levers being pivoted at intermediate points on their respective elongated bars at predetermined points adjacent opposite ends thereof, one end of each lever normally extending inwardly between the elongated bars and the other end of each lever extending outwardly in the opposite direction away from its respective elongated bar;
(f) a biasing spring which extends in tension between the said other ends of each pair of levers;
(g) and cam followers rotatably secured to the said other ends of each pair of levers for engaging the adjacent ends of the surface and rotating the levers about their pivot points on their respective elongated bars as the elongated bars move along the surface.

References Cited by the Examiner

FOREIGN PATENTS 711,770  7/1954  Great Britain.

MILTON BUCHLER, *Primary Examiner.*

P. E. SAUBERER, *Assistant Examiner.*